(12) United States Patent
Somanath et al.

(10) Patent No.: US 10,417,771 B2
(45) Date of Patent: Sep. 17, 2019

(54) FAST MRF ENERGY OPTIMIZATION FOR SOLVING SCENE LABELING PROBLEMS

(71) Applicant: INTEL CORPORATION, Santa Clara, CA (US)

(72) Inventors: Gowri Somanath, Santa Clara, CA (US); Jiajie Yao, Shanghai (CN); Yong Jiang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 9 days.

(21) Appl. No.: 15/566,656

(22) PCT Filed: May 14, 2015

(86) PCT No.: PCT/CN2015/078959
§ 371 (c)(1),
(2) Date: Oct. 13, 2017

(87) PCT Pub. No.: WO2016/179830
PCT Pub. Date: Nov. 17, 2016

(65) Prior Publication Data
US 2018/0137625 A1 May 17, 2018

(51) Int. Cl.
*G06T 7/143* (2017.01)
*G06T 7/11* (2017.01)
(Continued)

(52) U.S. Cl.
CPC ............ *G06T 7/143* (2017.01); *G06K 9/4638* (2013.01); *G06T 7/11* (2017.01); *G06T 7/136* (2017.01);
(Continued)

(58) Field of Classification Search
CPC .................................. G06T 7/143; G06T 7/11
See application file for complete search history.

(56) References Cited

U.S. PATENT DOCUMENTS 6,519,360 B1 * 2/2003 Tanaka ...................... G06T 7/90
345/597
8,121,407 B1 2/2012 K et al.
(Continued)

FOREIGN PATENT DOCUMENTS

CN 102246204 11/2011

OTHER PUBLICATIONS

International Preliminary Report on Patentability dated Nov. 23, 2017 for PCT Patent Application No. PCT/CN15/78959.
(Continued)

*Primary Examiner* — Santiago Garcia
(74) *Attorney, Agent, or Firm* — Green, Howard & Mughal LLP.

(57) ABSTRACT

Image scene labeling with 3D image data. A plurality of pixels of an image frame may be label based at least on a function of pixel color and a pixel depth over the spatial positions within the image frame. A graph-cut technique may be utilized to optimize a data cost and neighborhood cost in which at least the data cost function includes a component that is a dependent on a depth associated with a given pixel in the frame. In some embodiments, in the MRF formulation pixels are adaptively merged into pixel groups based on the constructed data cost(s) and neighborhood cost(s). These pixel groups are then made nodes in the directed graphs. In some embodiments, a hierarchical expansion is performed, with the hierarchy set up within the label space.

16 Claims, 11 Drawing Sheets

(51) Int. Cl.
  *G06K 9/46* (2006.01)
  *G06T 7/162* (2017.01)
  *G06T 7/136* (2017.01)
  *H04N 13/00* (2018.01)

(52) U.S. Cl.
  CPC .......... *G06T 7/162* (2017.01); *G06T 2200/04* (2013.01); *G06T 2207/10024* (2013.01); *G06T 2207/10028* (2013.01); *G06T 2207/20072* (2013.01); *G06T 2207/20076* (2013.01); *H04N 2013/0092* (2013.01)

(56) References Cited

U.S. PATENT DOCUMENTS

| | | | | |
|---|---|---|---|---|
| 8,705,867 | B2 | 4/2014 | El-Maraghi et al. | |
| 9,576,201 | B2* | 2/2017 | Wu .................... | G06K 9/00664 |
| 2006/0239558 | A1* | 10/2006 | Rafii .................. | G06K 9/00201 |
| | | | | 382/181 |
| 2013/0107010 | A1* | 5/2013 | Hoiem .................... | G06K 9/46 |
| | | | | 348/47 |
| 2013/0156285 | A1* | 6/2013 | Hayashida ............ | G06T 7/0012 |
| | | | | 382/132 |
| 2014/0355879 | A1* | 12/2014 | Agosta ............... | G06K 9/00791 |
| | | | | 382/170 |
| 2015/0030231 | A1* | 1/2015 | Porikli .................... | G06T 7/162 |
| | | | | 382/154 |
| 2015/0049105 | A1* | 2/2015 | Ju .......................... | G09G 5/006 |
| | | | | 345/555 |
| 2015/0206315 | A1* | 7/2015 | Price ...................... | G06T 7/162 |
| | | | | 382/180 |
| 2015/0339828 | A1* | 11/2015 | Djelouah ................ | G06T 7/194 |
| | | | | 382/173 |
| 2015/0356741 | A1* | 12/2015 | Osa .......................... | G06T 7/11 |
| | | | | 382/180 |
| 2016/0171706 | A1* | 6/2016 | Somanath ................. | G06T 7/11 |
| | | | | 382/154 |
| 2016/0234514 | A1* | 8/2016 | Ju ........................ | H04N 19/176 |

OTHER PUBLICATIONS

International Search Report and Written Opinion for International Application No. PCT/CN2015/078959 dated Feb. 14, 2016, 8 pages.

Ishikawa, "A Practical Introduction to Graph Cut", Department of Information and Biological Sciences, Nagoya City University The 3rd Pacific-Rim Symposium on Image and Video Technology (PSIVT2009). National Institute of Informatics, Tokyo, Japan, Jan. 13-16, 2009 (32 pages).

Kolmogorov, et al., "What Energy Functions Can Be Minimized via Graph Cuts?", IEEE Transactions on Pattern Analysis and Machine Intelligence, vol. 26, No. 2, Feb. 2004, pp. 147-159 (13 pages).

Li, et al., "Segmentation Using Superpixels: A Bipartite Graph Partitioning Approach", Dept. of Electr. Eng., Columbia Univ., New York, NY, USA, 2012 IEEE Conference on Computer Vision and Pattern Recognition (CVPR), Jun. 16-21, 2012 (8 pages).

Rastogi, et al., "Localized Hierarchical Graph Cuts", Sixth Indian conference on Computer Vision, Graphics & Image Processing, 2008. ICVGIP '08, Bhubaneswar, in Dec. 16-19, 2008 (8 pages).

Veksler, et al., "Superpixels and Supervoxels in an Energy Optimization Framework", ECCV'10 Proceedings of the 11th European conference on Computer vision: Part V, Springer-Verlag Berlin, Heidelberg © 2010, pp. 211-224 (14 pages).

Yan, Ke, "Research and Implement on Digital Image 3D Stereoscope Display Algorithm", Master's Thesis Mar. 31, 2012(Mar. 31, 2012) pp. 13 pages.

Boykov, Y. et al., "An Experimental Comparison of Min-Cut/Max-Flow Algorithms for Energy Minimization in Vision", IEEE Transactions on Pattern Analysis and Machine Intelligence, Sep. 30, 2004 (Sep. 30, 2004) No. 9 vol. 26, 13 pages.

* cited by examiner

FAST MRF ENERGY OPTIMIZATION FOR SOLVING SCENE LABELING PROBLEMS

CLAIM OF PRIORITY

This Application is a National Stage Entry of, and claims priority to, PCT Application No. PCT/CN2015/078959, filed on 14 May 2015 and titled "FAST MRF ENERGY OPTIMIZATION FOR SOLVING SCENE LABELING PROBLEMS", which is incorporated by reference in its entirety for all purposes.

BACKGROUND

A digital camera is a component often included in commercial electronic media device platforms, as well as vehicles. Digital cameras are now available in wearable form factors (e.g., video capture earpieces, video capture headsets, video capture eyeglasses, etc.), as well as embedded within smartphones, tablet computers, and notebook computers, etc. Three-dimensional (3D) cameras are becoming more common, and can now be found on many mobile devices/platforms, including vehicles. These devices provide enhanced entertainment and utility experiences to an end user. For example, photography and vehicle control systems may be enhanced by depth information output from the 3D camera.

The integration of digital cameras and powerful computing platforms has accelerated advancement of computer vision and computational photography. For such systems there are many use cases where a label is to be assigned to pixels in a frame of image data. Such labeling problems arise in scene segmentation, image restoration, motion analysis, and texture synthesis, for example. In segmentation, a digital camera user or machine vision control algorithm may need to segment an image frame into visually distinct objects. The definition of an "object" can vary from a single instance to a whole class of objects. Once selected, special effects may be applied to one or more objects, objects from multiple photos may be mixed into one, objects may be removed from photos, etc. Such object-based image processing may be on-line, or real-time with image capture, or may be performed during post-processing.

Labeling problems are often addressed by optimizing an energy function by applying a graph cut algorithm. The image pixels are modeled as a first order Markov Random Field (MRF), which may be solved using alpha-expansion (also known as 'graph cut'). The objective is then to minimize the following energy formulation using graph-cut/alpha-expansion:

$$M(f) = \Sigma_{p \in P} D(f_p) + \Sigma_{(p,q) \in N} V(p, q, f_p, f_q), \quad (1)$$

where the first term in the summation is the 'data cost' and the second is the 'neighborhood cost' or 'smoothness cost'. N is a neighborhood of a pixel p that includes a pixel q. With P being the set of pixels in an input image, and L being the set of labels $\{L_1, L_2, \ldots, L_{K_{pres}}\}$. The function $f$ is a labeling/mapping function that assigns a label $f_p \in L$ to each pixel $p \in P$. A single iteration of graph cut is binary for a given label $L_i$ and all other labels from set L effectively assigning one of two possible values to each node of the graph at that iteration. Cuts are iteratively performed until convergence of Eq. (1). Thus, K alpha-expansions or graph cuts are performed for K labels.

The complexity of the optimization problem (and hence the runtime and memory usage) is dependent on four main factors: the number of nodes in the graph; the connectivity or edges between nodes; the number of labels; and the formulation of the energy function using the costs. Conventional expansions process every pixel of an image as a node or vertex in the directed graphs, and typically utilize a connectivity of 4 to 8 neighbors. Thus the computation required to perform an optimization to arrive at a minimum energy is directly proportional to the image and label size. For example, a 720p (1280*720) image with 4-connectivity results in a graph of approximately 1 million nodes and 2 million edges. This large formulation (K iterations for a graph of millions of nodes and edges) results in a large runtime and memory consumption. The conventional techniques also suffer poor scalability, making their limitations more imposing as commercial devices incorporate cameras of greater resolution.

Thus, there is a need for an MRF optimization framework that significantly reduces the complexity of graph cut labeling, improves scalability of the technique, and yields high quality results with speed and efficient memory usage.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1:
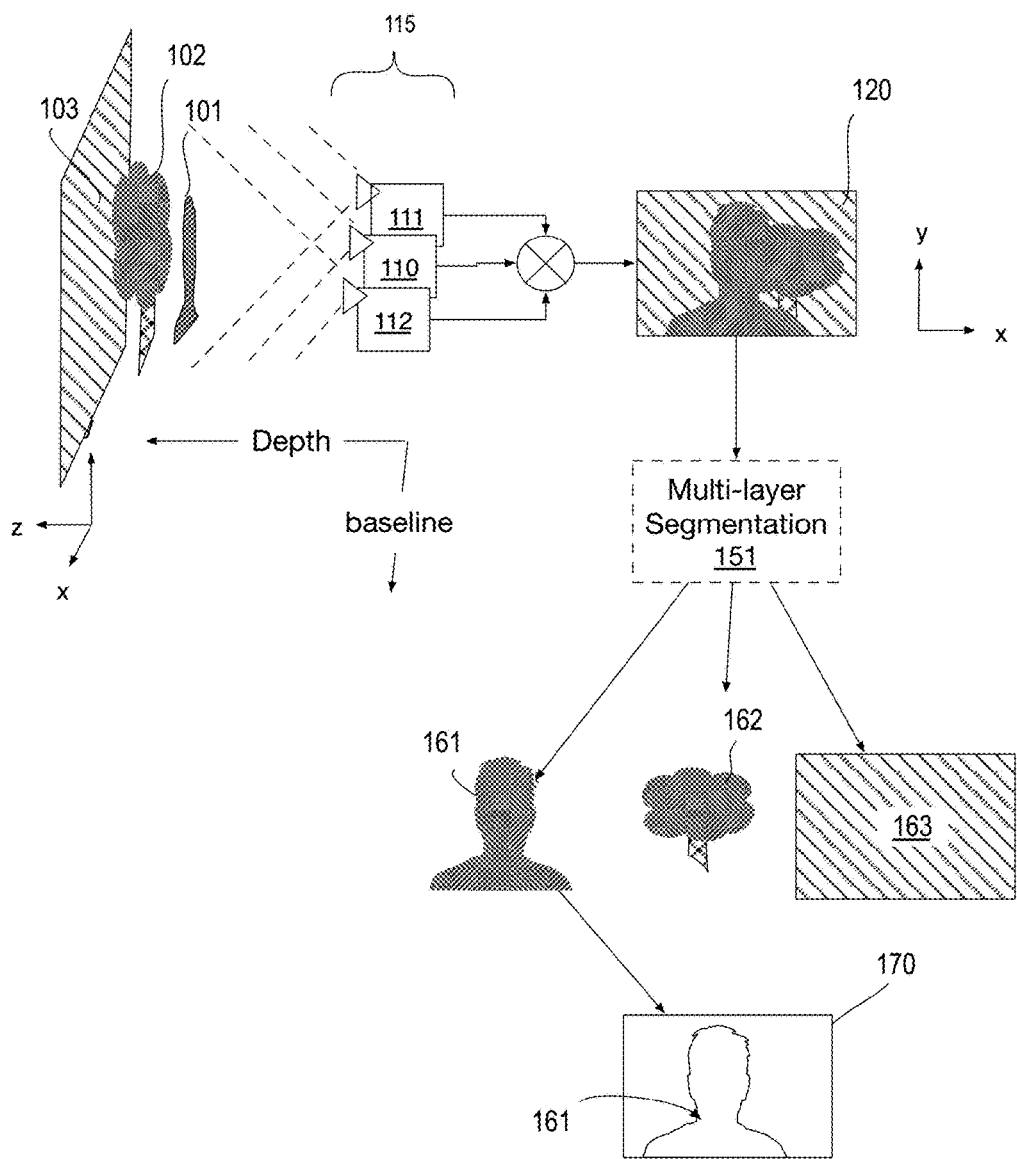
FIG. 1 is a schematic depicting multi-layer image data segmentation based on color and depth information, in accordance with some embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and in the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures, such system-on-a-chip (SoC) architectures for example, implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein may be implemented in hardware, for example as logic circuitry in an image processor, graphics processor, central processor, or other applications processor. Certain portions may be implemented in hardware, firmware, software, or any combination thereof. At least some of the material disclosed herein may also be implemented as instructions stored on a machine-readable medium, which may be read and executed by one or more programmable processors (e.g., graphics processors, central processors, or other applications processor). A machine-readable medium may include any medium and/or mechanism for storing or transmitting information in a form readable by a machine (e.g., a computing device). For example, a machine-readable medium may include read only memory (ROM); random access memory (RAM);

magnetic disk storage media; optical storage media; flash memory devices; electrical, optical, acoustical, or other similarly non-transitory, tangible media.

One or more system, apparatus, method, and computer readable media having an advantageous graph structure for MRF optimization is described below. In some embodiments, graph structure for MRF optimization is applied in a multi-layer image segmentation method utilizing 3D image data. For these exemplary embodiments, a plurality of pixels of an image frame may be segmented based at least on a function of pixel color and a pixel depth over the spatial positions within the image frame.

In some embodiments, a graph-cut technique is utilized to optimize a data cost and a neighborhood cost in which at least the data cost function includes a component that is a dependent on a depth associated with a given pixel in the frame. In some such embodiments, an RGB-D automated labeling algorithm employs a Markov Random Field (MRF) formulation. In further embodiments, both the data cost and smoothness functions are dependent on a color (e.g., RGB) and a depth (D) associated with each pixel. In some embodiments, labeling may be further predicated on pre-segmentation labels assigned based at least on 3D position clusters.

In some embodiments, in the MRF formulation pixels are adaptively merged into pixel groups based on the constructed data cost(s) and neighborhood cost(s). These pixel groups are then made nodes in the directed graphs. As described further below, the number of graph nodes is therefore variable and adaptive to conditions of the input image scene. Complexity for a graph cut optimization is reduced as a function of the extent by which a pixel population of an image frame is reduced through merging into a population of pixel groups.

In some embodiments, the MRF formulation utilizes a hierarchical expansion. The hierarchical formulations described herein are within the label space, rather than in the image pixel space. As described further below, intelligent construction of the hierarchical graph levels may reduce the label search space associated with each expansion stage in a manner that results in a good approximation of a globally minimized energy. As a further advantage, at least one of the expansion stages may parallelized, enabling greater computational efficiency on processors having multi-thread and/or multi-cored architectures.

FIG. 1 is a schematic depicting multi-layer image data segmentation based on color and depth information collected by an array camera 115, in accordance with exemplary embodiments. For purposes herein, in "multi-layer" segmentation a scene may be separated into more than two objects with each object receiving a unique label or segment ID rather than merely a foreground/background designation (which is typically known as "bi-layer" segmentation).

In some embodiments, array camera 115 is a component of a mobile computing device having a plurality of camera hardware modules (CM) 110, 111, and 112 with a predetermined baseline relationship, Although in the exemplary embodiments three camera hardware modules are illustrated, any number of camera hardware modules and/or image sensors may be included in an array camera as embodiments herein are not limited in this respect. Each of the plurality of camera modules 110, 111, 112 output an image captured from a different camera viewpoint. In exemplary embodiments, the image(s) captured from each viewpoint is captured at substantially the same instant of time such that they contain image data for a given scene. For example, at least a portion of scene including foreground object 101 (subject) and background 103 is captured in three image frames, one of which may be designated as a reference and combined into an image frame 120 having depth or disparity information. For example, where CM110 has a higher resolution (e.g., 8 megapixel, or more) than camera modules 111, 112 (e.g., 720p, HD, etc.), CM 110 may provide a default reference RGB image. CM 111 and CM 112 may be considered supplemental to the reference and are each associated with predetermined baseline vector (length and direction) from camera module 110. In an exemplary embodiment where camera modules 110, 111, and 112 are on a mobile platform, the baseline vector between the reference camera module and each supplemental camera module may have a length of tens of millimeters to tens of centimeters, depending on the form factor. In other embodiments, where camera modules 110, 111, 112 are separate infrastructure fixtures, baseline lengths may be on the order of meters. In one exemplary mobile device embodiment, camera modules 110, 111, and 112 are along one baseline with camera modules 111 and 112 spaced by known distances on opposite sides of reference camera module 110.

In accordance with some embodiments, multi-layer segmentation 151 is performed to determine multiple unique labels for the different objects based, at least in part, on color and depth information. For example, real world object 101 is labeled with an image segment identifier 161, real world object 102 is labeled image segment ID 162, and real world background 103 (e.g., sky) is labeled image segment ID 163. An automated association made between segment ID 161 and output image frame 170 may then be in better agreement with human perception.

Although various techniques are described further below in the context of multi-layer segmentation 151 as an illustrative embodiment, this is merely for the sake of clarity of discussion. It will be appreciated by those of ordinary skill in the art that the underlying logic and algorithms pertaining to MRF formulations described herein can be applied to many different platforms, image data, and labeling problems. For example, although input image data includes disparity or depth information in addition to color information (RGB-D) for some exemplary scene segmentation embodiments, the MRF formulations described herein are also applicable to input image data comprising only RGB data. As another example, the MRF formulations described herein are also applicable to a stereo imaging label problem, where the labels to be selected through MRF energy optimization are indicative of disparity or depth values. For such embodiments, input data may include two or more RGB images with a mapping function to be optimized being perhaps an intensity difference between pixels of the two input images.

Figure 2:
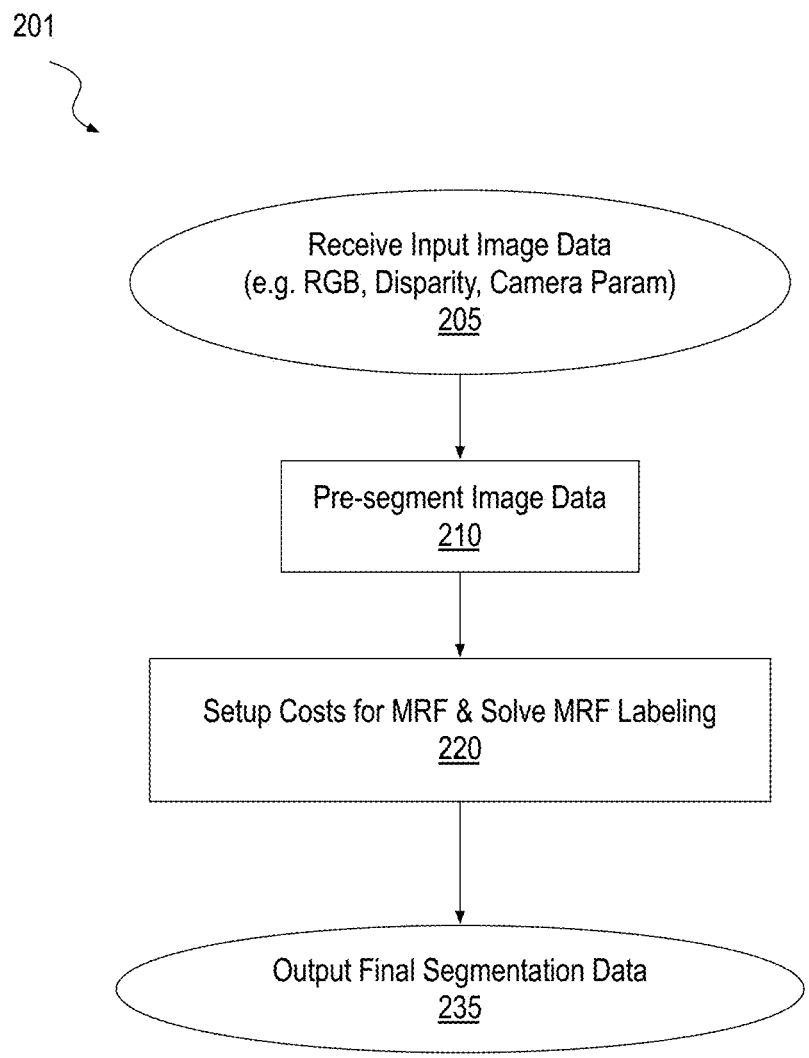
FIG. 2 is a flow diagram of a multi-layer image data segmentation method employing color and depth information, in accordance with some embodiments.

FIG. 2 is a flow diagram of multi-layer image data segmentation method 201, in accordance with some embodiments. Method 201 begins with receiving 3D input image data. In the exemplary embodiment, the input image data includes depth or disparity information and color information for a plurality of pixels associated with a particular image frame defined by the 2D spatial correlation of the pixels. In advantageous embodiments, there is a depth or disparity value associated with each pixel of an image frame.

Figure 6A:
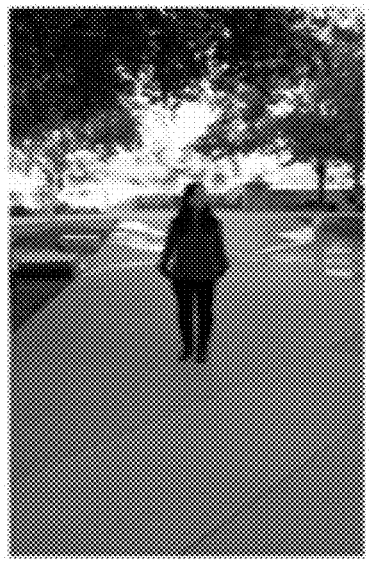
FIG. 6A is a color image illustrating an input RGB image, in accordance with some embodiments.

In one exemplary embodiment, image data received at operation 205 includes pixel values (e.g., intensity) for each of a plurality of color channels. The color channels may be in any color space. In some embodiments, the input image data received at operation 205 includes color information in the RGB color space. FIG. 6A illustrates in color an input RGB image received at operation 205, in accordance with some embodiments. Image data may also be in other color spaces, perhaps having been preprocessed upstream of method 301, for example converted to color information to the YUV/HSL/HSV space from another color space such as the RGB color space, the $YP_BP_R$ (luma, blue difference chroma $Y_B$, and red difference chroma $P_R$) color space, the $YC_BC_R$, (luma Y, blue difference chroma $C_B$, and red difference chroma $C_R$) color space, or the like.

Figure 6B:
FIG. 6B is a gray scale image illustrating a disparity map associated with the input image depicted in FIG. 6A, in accordance with some embodiments.

In some embodiments, depth information received at operation 205 is in the form of a depth map correlated with a plurality of pixels, each having an image coordinate x,y associated with the input image frame. In other embodiments, the depth information received at operation 205 is in the form of a disparity map correlated with a plurality of pixels, each having an image coordinate x,y associated with this input image. FIG. 6B illustrates in grey scale a disparity map associated with the input image depicted in FIG. 6A, in accordance with some embodiments. In some embodiments, a disparity value associated with a pixel indicates the correspondence of the pixel in one image (e.g., collected by camera module 110) to a pixel in another image (e.g., collected by camera module 111). The disparity estimation may be made by any means, as embodiments herein are not limited in this respect. Color information may be filtered if desired using any known filtering technique (e.g., Gaussian blur) to reduce noise and/or improve performance of subsequent segmentation operations, for example reducing the likelihood that objects are over-segmented. Disparity information may also be filter, for example with any statistical technique to remove noise or values associated with low confidence. For some embodiments where a 3D (X,Y,Z) coordinate map is not received as an input at operation 205, a "world 3D coordinate" map of the image data is generated at operation 205. Any mapping functions may be utilized to determine 3D spatial coordinates, for example based on camera focal length(s), camera baseline, width and height of the input image, image coordinates of a pixel within the input image frame, and a disparity value at the pixel position.

Method 201 continues at operation 210 where the input image data is pre-segmented. Pre-segmentation generates an initial image segmentation (labeling) of the input scene and may adaptively assign a preliminary set of labels based on some set of criteria determined for a given scene. Pre-segmentation may be useful, for example, to assess the complexity of a scene such that the number of labels to be assigned by the subsequent MRF may be reduced where scene complexity is low and vice versa. In some exemplary embodiments, a plurality of depth bins is determined from clusters in the 3D image coordinate space. A probability of an occurrence within each of a plurality of 3D spatial position bins may be determined. In other words, a mass probability density or distribution function of 3D spatial positional images are binned out and the set of labels $L=\{L_1, L_2, \ldots, L_{K_{pres}}\}$ is generated based on the bins. A label $L_1$ (e.g., an integer value ID), is then assigned to one or more pixel in each connected component that satisfies a predetermined minimum connected component size. In some embodiments, color clustering is further utilized to resolve any pixels that fail to satisfy the minimum 3D spatial position cluster size.

Figure 6C:
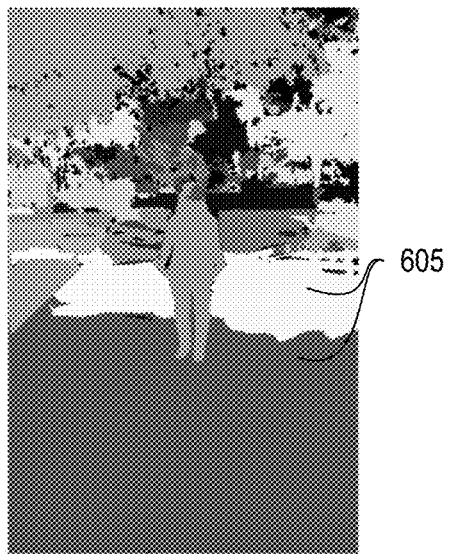
FIG. 6C is a gray scale image illustrating pre-segmentation labeling generated from based on the images in FIG. 6A and FIG. 6B, in accordance with some embodiments.

FIG. 6C illustrates in grey scale pre-segmentation labeling generated based on the images in FIG. 6A and FIG. 6B, in accordance with some embodiments. In this example, there are 76 segment-identifying labels 605. The output of operation 210 (FIG. 2) may include pixels with unknown segmentation ID.

Returning to FIG. 2, method 201 continues with MRF segmentation operation 220, which generates the final segmentation data to be output at operation 235. In some embodiments, segmentation at operation 220 entails alpha-expansion (also known as 'graph-cut') where the objective is to minimize the energy formulation of Eq. (1). Data cost and neighborhood (smoothness) cost functions in Eq. (1) are setup for the MRF and energy function then solved iteratively over the graph nodes for each label. Data cost $D(f_p)$ intuitively measures the cost of assigning a given label to a given node of the directed graph constructed for the input image. In other words, the data cost $D(f_p)$ defines the cost of assigning a label $f_p$ to node p. Any data cost $D(f_p)$ known in the art may be employed in embodiments herein. The smoothness component of Eq. (1) determines the cost of assigning $f_p$ top and $f_q$ to q, where p & q are neighboring nodes as defined by N. The neighborhood cost represents the costs for two neighboring nodes to have same or different labels. In some embodiments, the neighborhood q comprises four nearest neighbors of node p. In other embodiments, the neighborhood q comprises eight nearest neighbors of p. Both of these exemplary neighborhood sizes are suitable for embodiments where the neighborhood cost is a function of at least the pixel depth and the pixel color. Any neighborhood cost $V(p,q,f_p,f_q)$ known in the art may be employed in embodiments herein.

In some embodiments, graph nodes in the MRF formulation are adaptively generated pixel groups that may have arbitrary size and shape. There are therefore also an arbitrary number of pixel groups in a population for a given input image. Hence, rather than constructing graphs with a 1:1 correspondence between nodes and pixels (e.g., each pixel being a graph node), the number of graph nodes constructed for input images of fixed pixel count will vary as a function of the extent by which the pixels are merged into groups.

Figure 3A:
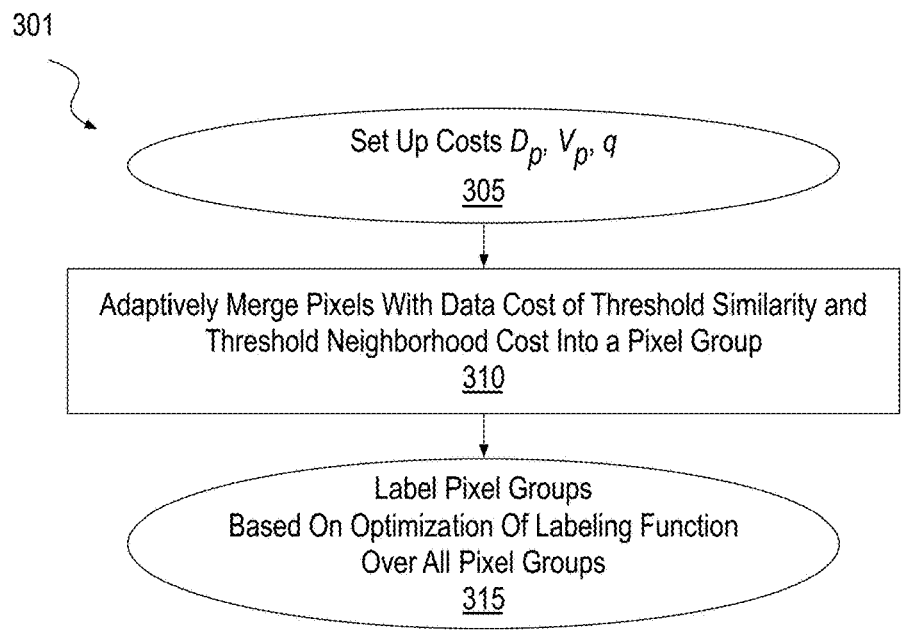
FIG. 3A is a flow diagram of a method of adaptive MRF optimization, in accordance with some embodiments.

FIG. 3A is a flow diagram of an adaptive MRF optimization method 301, in accordance with some embodiments. Method 301 may for example be performed as operation 220 in method 201 (FIG. 2). Method 301 begins with setting up the cost functions and defining the neighborhood at operation 305. The data cost function will typically include terms based at least on pixel color and pixel position within the image frame, and any such function known in the art may be employed. In some advantageous embodiments, the data cost function further includes terms based on pixel depth, and more advantageously further includes a term based on pre-segmentation. Such a function may then implement the logic that nodes of a same depth are more likely to belong to the same object than are those at different depths. Similarly, nodes of the same color are more likely to belong to the same object than are those of different color. Nodes closer together in the image plane (xy) are more likely to belong to the same object than are those farther apart, and nodes having a same pre-segmentation label are more likely to belong to a same object than are those having different pre-segmentation labels. All these factors incorporated together into the cost function can improve the accuracy of the pixel groups formed and optimize the number of groups formed for a given input scene. One exemplary data cost function in accordance with some such embodiments takes the form:

$$D(p,f) = w_d(p)\Phi(I_{XYZ}(p) - \text{bins}_{preS}(f)) + w_c(p)$$
$$\Sigma_{i=1:3, b=1:hbins}\Phi(I_f(p) - H_{fi}(b)) + w_p(p)\Phi(p - \Delta_f(p)) + w_s(p)\Phi(f - I_{preS}(p)). \qquad (2)$$

In Eq. (2) the first term is the pixel depth component and is based on a 3D spatial position image $I_{XYZ}$, for example computed at operation 210 (FIG. 2). The second term is the pixel color component and is based on a histogram of colors generated from pixels of $I_l$ with label l and a number of bins hbins. $H_{f_i}(b)$ represents the $b^{th}$ histogram bin corresponding to color channel i. The third term is based on pixel position. A distance map $\Delta_l$ is calculated with $\Delta_l(p)$ being the normalized distance of pixel p from the nearest pixel of label l. The fourth term is based on the pre-segmentation image $I_{pres}$, for example determined at operation 210

Each component of the data cost function $D(p,f)$ is weighted by a corresponding per-pixel scalar weight $w_d$, $w_c$, $w_p$, $w_s$. In some embodiments, each weight is tunable and/or adaptive in the sense that the weight may be varied to suit the implementation. For example, where a particular 3D sensor generates lower confidence depth data, $w_d$ may be reduced. In some embodiments, the weights are set for a pixel p as:

$$w_x(p) = W_x * (w_x(p) + \theta_x), \quad (3)$$

where x is one of d (depth), c (color), p (position), and s (pre-segmentation). W is the scalar weight, and θ is a scalar offset that is configurable/tunable, for example by a user through the application layer of the software stack. Through manipulation of the offset θ, objects may be segmented at operation 230 more or less on depth, for example to ensure object may be separated from the ground, or not.

The data cost kernel function $\Phi(\cdot)$ may be any known to be suitable for a graph-cut, for example absolute difference, or a squared difference, etc. In some exemplary embodiments, the data cost kernel function is:

$$\Phi(x) = 1 - e^{-x/\sigma}, \quad (4)$$

where σ is scalar and in some embodiments the standard deviation of all values of x.

The neighborhood cost function will typically include terms based at least on pixel color and pixel position within the image frame, and here too, any such function known in the art may be employed. In some advantageous embodiments, the neighborhood cost function includes components for both color and depth to provide a motivation for maintaining smoothness (a same segment label) over two neighboring pixels that have sufficiently similar color and/or depth. In some illustrative embodiments, the neighborhood cost is formulated as:

$$V(p,q,f_p,f_q) = w_c(p)e^{-|I_f(p)-I_f(q)|/\sigma_f} + w_d(p)e^{-|I_{XYZ}(p)-I_{XYZ}(q)|/\sigma_{XYZ}}, \quad (5)$$

where $\sigma_f$, $\sigma_{XYZ}$ are scalars and in some embodiments are the standard deviation of all pixel values in the input image $I_f$ and 3D spatial image $I_{XYZ}$, respectively. The weights $w_c$, $w_d$ may be calculated similarly to the data cost weights, but with independent/different weight and offset values.

Method 301 continues with pixel merging operation 310 where pixels in the input image are merged based on a similarity of the data cost associated with being assigned a particular label. In further embodiments, the pixel merging criteria is further based on the neighborhood cost associated with the merging of a pixel pair. In some embodiments, pixels $p_1$ and $p_2$ are merged only if there exists one label L that minimizes the data cost for both $p_1$ and $p_2$, and the neighborhood cost of having different labels for $p_1$ and $p_2$ satisfies a predetermined discontinuity threshold $T_1$:

$$\text{Merge } p_1 \text{ with } p_2 \text{ if} \begin{cases} D_{p1} = \{D_{p1}(\cdot)\}, D_{p2}(L) = \min\{D_{p2}(\cdot)\}, \text{ and} \\ V_{(p1,p2)}(L_{p1}, L_{p2}) \geq T_1 \text{ when } L_{p1} \neq L_{p2} \end{cases} \quad (6)$$

As noted above, both the data cost and neighborhood cost include pixel depth information in some embodiments (e.g., utilizing Eq. (2) and (5)). While the discontinuity threshold $T_1$ may be a fixed value, in some advantageous embodiments the threshold is computed dependent upon a distribution of neighborhood costs over the plurality of pixels. For example, a mass probability distribution or density function of neighborhood cost over all pixels in the input image may be computed, and the threshold selected based on predetermined location within the mass probability distribution function such that the threshold is sufficient to ensure not too many nodes of few pixels are generated by the merging operation. In some embodiments, the discontinuity threshold $T_1$ is satisfied for a neighborhood costs that is larger than at least 50%, and advantageously at least 70% of all neighboring pixel's $V_{(p,q)}(L_p, L_q)$ value.

Merging a first pixel p with a second pixel q at operation 310 may be further contingent on a number of pixels in each pixel group. In some embodiments, pixel merging is constrained to a predetermined maximum pixel count. This may limit potential for under-segmentation. The maximum pixel count threshold ($T_2$) may be predetermined for a given implementation, for example based on a number of pixels in the input image. The maximum pixel count threshold $T_2$ may be many thousands of pixels (e.g., 10,000 pixels for a 720p image). Any pixels that fail the merging criteria remain ungrouped individuals that are each assigned to a unique node in constructed graphs.

Figure 6D:
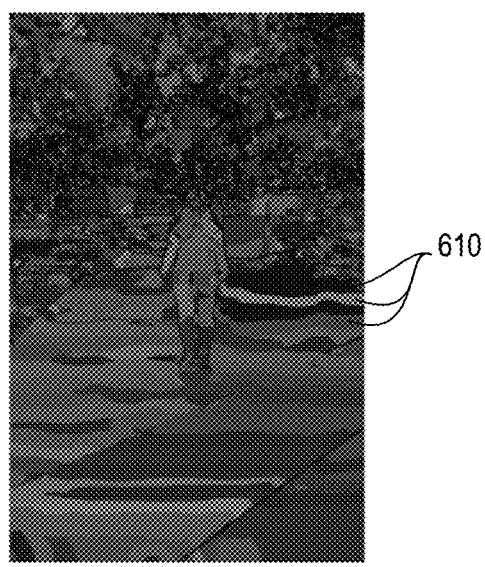
FIG. 6D is a color image illustrating pixel groups, formed by merging pixels of the input image depicted in FIG. 6A, in accordance with some embodiments.

FIG. 6D is a color image illustrating pixel groups 610, formed by merging pixels of the input image depicted in FIG. 6A by operation 310, in accordance with some embodiments. Each colored block is to be a node in a graph cut algorithm. Black pixels are unassigned, single-pixel nodes. For this example, after merging pixels the number of the (pixel group) nodes in constructed graphs is nearly a 5× reduction from the number of pixels in FIG. 6A (e.g., ~190,000). Notably, the irregular shapes and sizes of the pixel groups generated with the merging algorithm embodiments described herein maintain discernable features, such as the human subject and sidewalk, in contrast to super-pixel implementations known in the art.

Method 301 completes with labeling the pixel groups based on an optimization of a labeling function over all pixel groups at operation 315. In some embodiments, the set of labels applied to the graph nodes are those generated at the pre-segmentation operation 210 of method 201 (FIG. 2). While any graph cut algorithm may be utilized at operation 315 to optimize the label assignment over the nodes (pixel groups and ungrouped pixels), in some embodiments a hierarchical alpha-expansion is performed to reduce the label search space for each stage. In some exemplary hierarchical expansion embodiments labels are first grouped and a first expansion determines the label group assignment for all nodes, and a second expansion determines the final label set. This multi-staged optimization is in contrast to a typical graph cut algorithm where optimization is run for all labels for each iteration. Such a multi-staged optimization is also in contrast to a hierarchy within the pixel space, for example where optimizations might be run at multiple image resolutions.

Figure 3B:
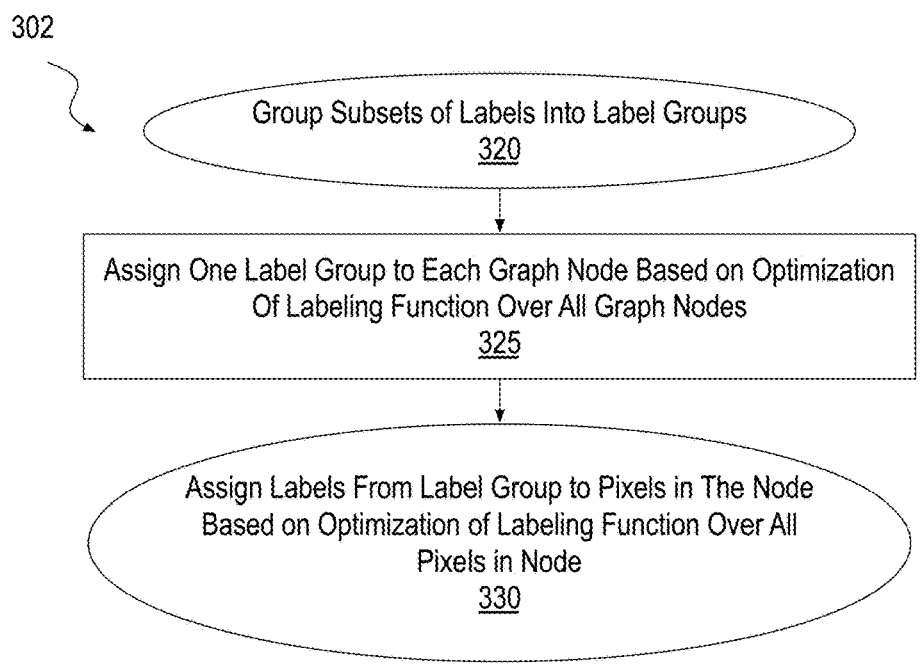
FIG. 3B is a flow diagram of a method of hierarchical expansion, in accordance with some embodiments.

FIG. 3B is a flow diagram of a method 302 for hierarchical expansion, in accordance with some embodiments. Method 302 may be performed at operation 315 of method 301 (FIG. 3A), for example. At operation 320, the labels are grouped into label subsets, or label groups. In some embodiments, the grouping is performed in a manner that allows for any given label to belong to one or more groups. At operation 325, a labeling function, such as the MRF energy Eq. (1) including data cost and neighborhood cost terms, such as Eq. (2) and Eq. (5), is optimized over all graph nodes to assign one label group to each node. This global expansion is iteratively solved to convergence until total change in energy between successive iterations is sufficiently small. Each iteration is a binary cut for a given label group, and all other label groups. Thus, at operation 325 there is an expansion for each label group. Unless each label group has only one label, the set of label groups represents a smaller label space than the input set of labels, reducing iterations of the global expansion concomitantly. Method 302 continues at operation 330 where in a second stage, a local expansion is performed assigning labels from a label group to pixels in a given node based on an optimization of the labeling function over all pixels in the node.

In some embodiments, the local expansions at operation 330 are executed in parallel. With the second expansion stage being local, each local expansion can be performed for each label group independently. This independence allows for concurrent execution of pixel labeling across nodes and enables multi-threaded techniques to be leveraged in the MRF optimization. For example, labels for pixels in a first pixel group may be optimized by a first processor thread or a first processor core, and labels for pixels in a second pixel group may be optimized by second processor thread or a second processor core concurrently (e.g., in parallel). Each processor thread may further be a workload assigned over multiple processor cores using any technique known in the art. Labels for pixels in different pixel groups may be optimized with different processor threads executing on different processor cores. At the completion of operation 330 method 302 is complete. A label for each pixel is returned, the set of pixel label assignments having been optimized over two stages (operations 325 and 330). For the exemplary segmentation embodiment illustrated by method 201, the pixel labels generated by operation 330 represent scene segment identifiers for output as segmentation data at operation 235 (FIG. 2). For a stereo imaging embodiment, the pixel labels generated by operation 330 may represent a scene depth or disparity value from which a depth map may be constructed using any known technique.

Figure 4A:
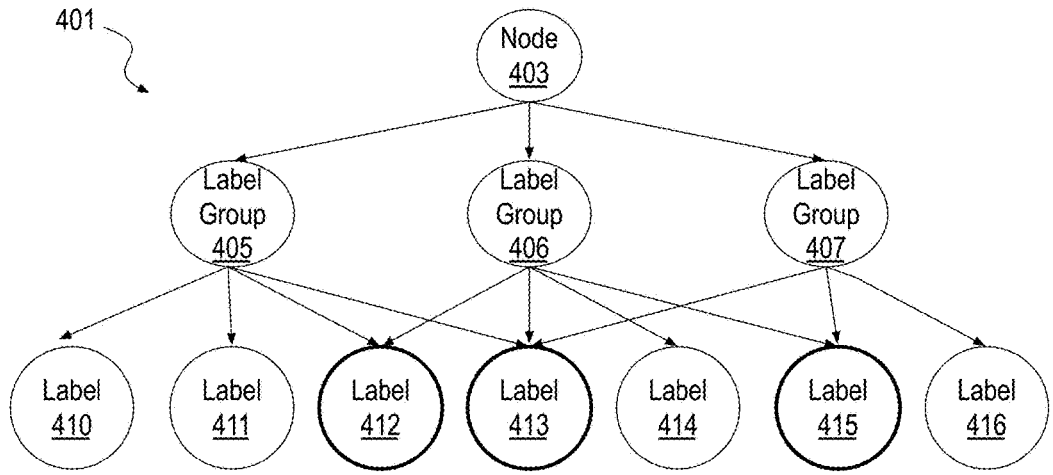
FIG. 4A illustrates a hierarchical label space, in accordance with some embodiments.

FIG. 4A illustrates a two-level hierarchical label space 401, in accordance with some embodiments. Hierarchical label space 401 may be constructed for an input image to implement method 302 (FIG. 3B), for example. In FIG. 4A, there are seven labels 410-416. In some embodiments where graph 401 is constructed as part of segmentation method 201, each of the seven labels 410-416 is one of the pre-segmentation labels generated at operation 210 (FIG. 2). The labels at the lowest level are grouped into three label groups 405, 406, 407. Notably, a label may belong to one or more groups. In the example illustrated, labels 412 and 415 belong to two different label groups, 405, 406 and 406, 407, respectively. Label 413 belongs to all illustrated label groups 405, 406, and 407. Label overlap between label groups advantageously allows for a loose coupling between nodes. For embodiments where each node 403 may be one or more pixels merged into pixel groups, the extent of label overlap may vary as a function of the number of pixels in the node. For example, larger nodes assigned label groups containing a greater number of labels may share a greater number of labels with neighboring nodes. Label groups assigned through a node-level global optimization with greater overlap improves the likelihood of reaching a global minimum in the energy function through multi-staged optimization. For example, assigning either label group 405, 406, or 407 to node 403 in the global optimization stage (e.g. operation 325 in method 402 (FIG. 4B)) allows pixels within that node to receive label 413 as a result of the local optimization stage.

Figure 4B:
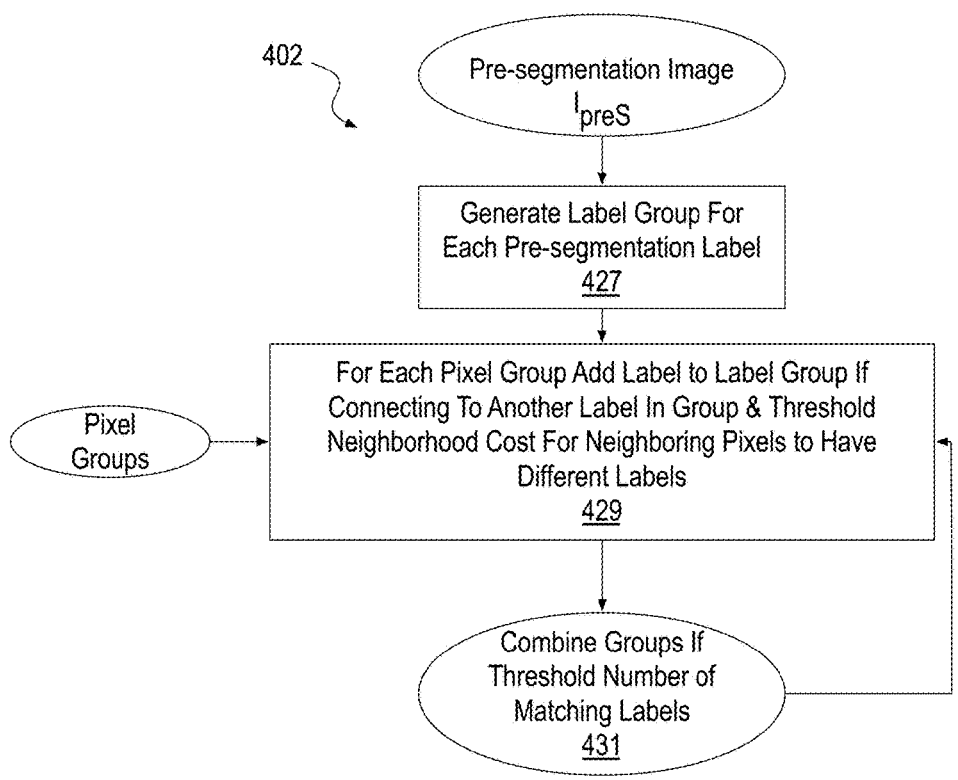
FIG. 4B illustrates a method of generating a label group for a hierarchical expansion, in accordance with some embodiments.

In some embodiments, labels of an input label set are grouped (pseudo)randomly into a predefined number of groups such that each group includes the same number of labels and each node is in at least a threshold number of groups. In other embodiments, a logical grouping is performed on the basis of some assumptions about the input image data and/or upstream processing that has already been performed. FIG. 4B illustrates a method 402 for generating a label group for a hierarchical expansion, in accordance with some embodiments. Method 402 may be employed to implement hierarchical label space 401, for example. Method 402 begins with receiving an initial set of labels assignments, such as that provided in pre-segmentation image output by operation 210 (FIG. 2). Under the assumption each node is assigned the label with minimum data cost at operation 210, a label group is generated for each (pre-segmentation) label at operation 427. Additional labels are added to groups at operation 429 starting with any node.

In some embodiments, at operation 429 a label is added to a label group if the labels are connecting to each other (e.g., in pre-segmentation image $I_{preS}$) and the associated neighborhood cost between two neighboring pixels assigned the connecting labels is sufficiently high (e.g., satisfying a predetermined threshold, which may be adaptive or fixed). In some exemplary embodiments, a sum of neighborhood cost between two connecting labels is computed as:

$$V_{sum} = \Sigma_{(p \in L_i \text{ and } q \in L_j, p \text{ and } q \text{ are neighboring pixels})} V_{(p,q)}(L_i, L_j). \quad (7)$$

The neighborhood cost function is divided by the summed image area occupied by label i ($A_i$) and the image area occupied by label j ($A_j$). Labels are combined at operation 429 in response to this quotient satisfying a predetermined threshold:

$$\frac{V_{sum}}{A_i + A_j} \geq \text{threshold } T_3. \quad (8)$$

In some embodiments, threshold $T_3$ depends on a probability density or distribution (e.g., mass function or histogram) of neighborhood cost between all the labels (e.g., in pre-segmentation image $I_{preS}$).

If no additional labels can be added to a group for a given node, the analysis is repeated for the label group associated with a next node. Hence, beginning with the initial label assignment, there is one label group for each node, and the process of adding labels allows for any given label to be assigned to multiple label groups. After the label groups are built up, a check for label intersection is performed at operation 431, where label groups are combined if the number of matching labels between two label groups satisfies a predetermined threshold (e.g., combine if >75-90% matching).

While FIGS. 3B, 4A, and 4B illustrate an exemplary two-level label hierarchy, the number of levels may be adapted for each labeling problem and/or application (e.g., segmentation, stereo imaging, etc.) as a function of the logical relationships between label levels.

Figure 5:
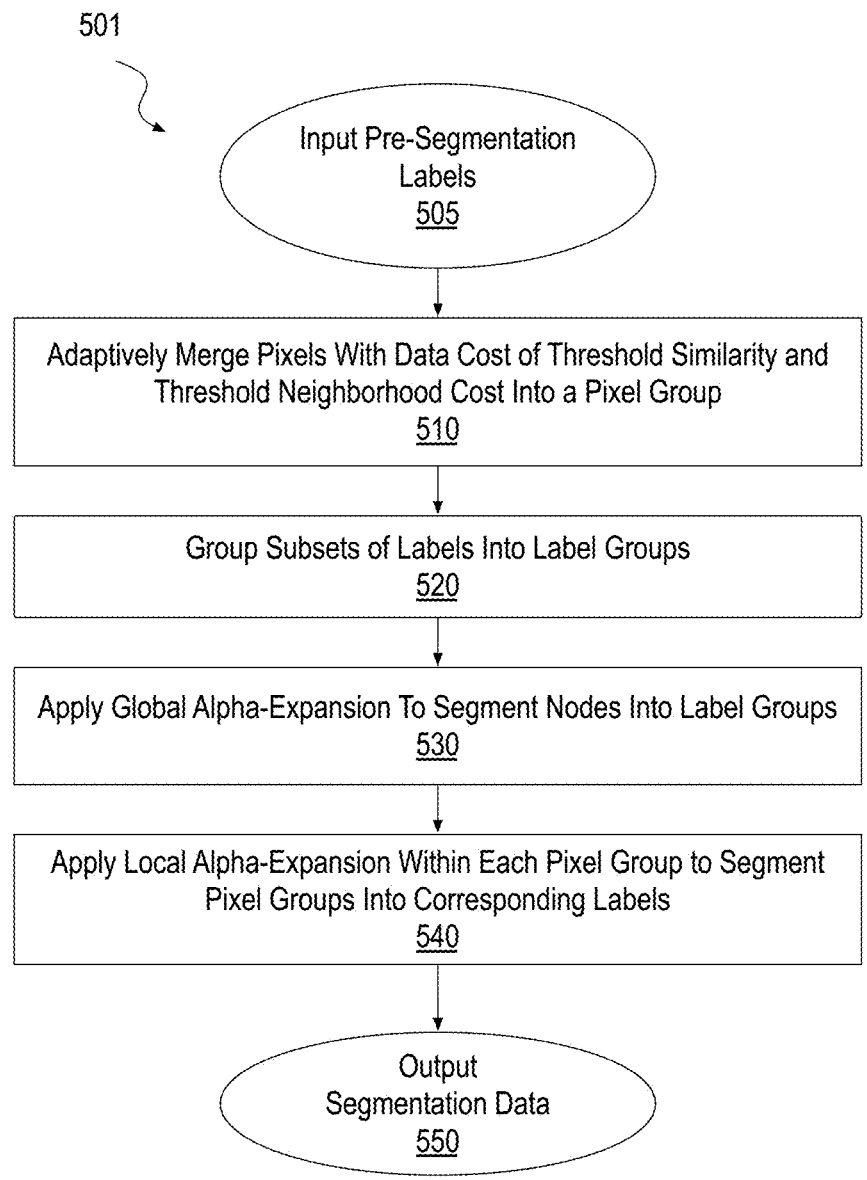
FIG. 5 is a flow diagram of a method of performing an MRF optimization as part of the segmentation method depicted in FIG. 2, in accordance with some embodiments.

FIG. 5 is a flow diagram of a method 501 for an MRF optimization performed as part of the segmentation method depicted in FIG. 2, in accordance with some embodiments. Method 501 combines some of the techniques described in embodiments above to enhance the speed and memory efficiency of the MRF optimization. At operation 505 pre-segmentation labels are received as an input. The labels may be initially defined to cover image areas, for example in a pre-segmentation image $I_{preS}$ generated by operation 210 (FIG. 2). At operation 510, pixels of the input image having a sufficiently similar data cost and a threshold neighborhood cost are merged to form pixel groups as described above. These pixel groups and any unmerged pixels are then a reduced node set for directed graph construction. With the pixel groups defined, subsets of the pre-segmentation labels are grouped at operation 520 into label groups, for example as described above. Connectivity of the pre-segmentation labels drives inclusion of a label in a label group, further informed by neighborhood cost. Differences between the pixel merging algorithm(s) leading to a number of nodes and the label grouping algorithm(s) result in set of graph nodes and label groups with overlapping labels. At operation 530, global alpha-expansion is performed over all the nodes to optimally segment them into the label groups. At operation 540, a local alpha-expansion is performed within each pixel group to optimally segment the nodes further into the labels. At operation 550, the segmentation data including an indication of pixel-label assignments is output for storage to an electronic memory in association with the input image.

Figure 6E:
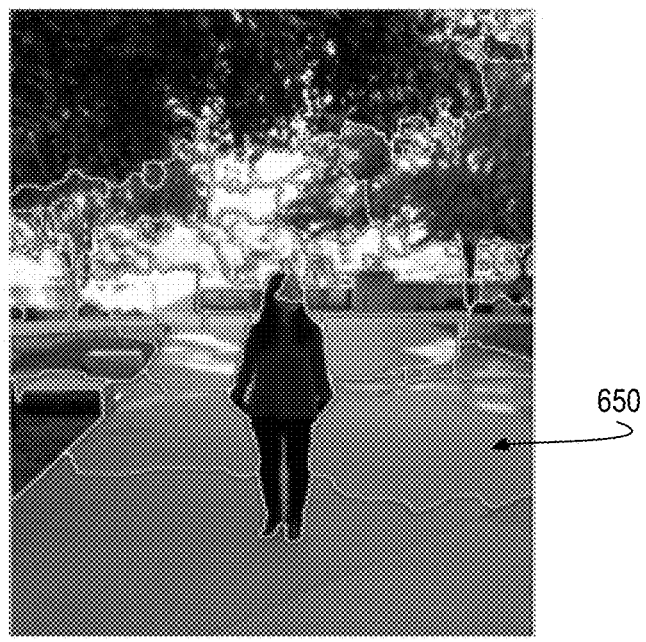
FIG. 6E illustrates multi-layered segmentation of the input image depicted in FIG. 6A, in accordance with some embodiments.

FIG. 6E is a color image illustrating multi-layered segmentation of the input image depicted in FIG. 6A through application of an MRF optimization in accordance with some embodiments. The white traces 650 demark edges between scene segments determined by a processor executing instructions following one or more of the methods described above in the context of FIG. 1-5. In this example, the 76 labels (assigned to pixels as initial segments 605 in FIG. 6C) generated at pre-segmentation were grouped into 61 groups. These label groups were then optimized over the ~190,000 nodes (depicted in FIG. 6D) generated for the input image.

Figure 6F:
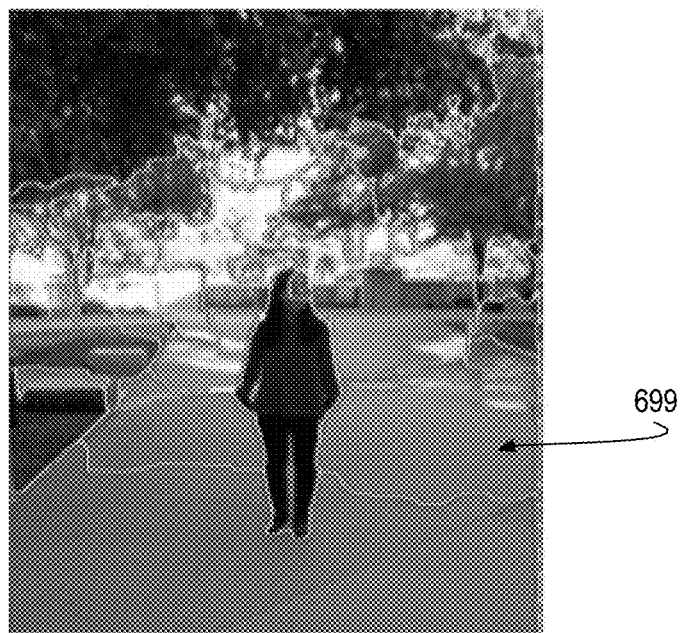
FIG. 6F illustrates multi-layered segmentation of the input image depicted in FIG. 6A through application of a conventional MRF optimization method.

FIG. 6F illustrates multi-layered segmentation of the input image depicted in FIG. 6A through application of a conventional MRF optimization method. The white traces 699 demark edges between scene segments determined by a processor executing instructions following a conventional graph-cut where each pixel is processed as a graph node and a single-stage global optimization is performed for the same input label set using a data cost and neighborhood cost set up equivalent to those utilized in the exemplary MRF optimization associated with FIG. 6E. As such, FIGS. 6E and 6F provide a comparison of segmentation results achieved by a fast MRF optimization vs. a traditional approach. Verifying correctness of the fast MRF formulation, the final energy after optimization is similar between the two results.

With respect to computation speed, the conventional MRF required over 5× more runtime to generate the results in FIG. 6F than did the exemplary MRF optimization associated with FIG. 6E executing on the same platform. Runtime reductions on other samples have ranged from ~4×-12× depending on the input image, averaging at ~8.5×. RAM tests collected from a reference platform including a multi-core thread-enabled processor with 16G RAM indicate peak memory usage was on average 71% of the traditional pixel-based graph-cut optimization.

Figure 7:
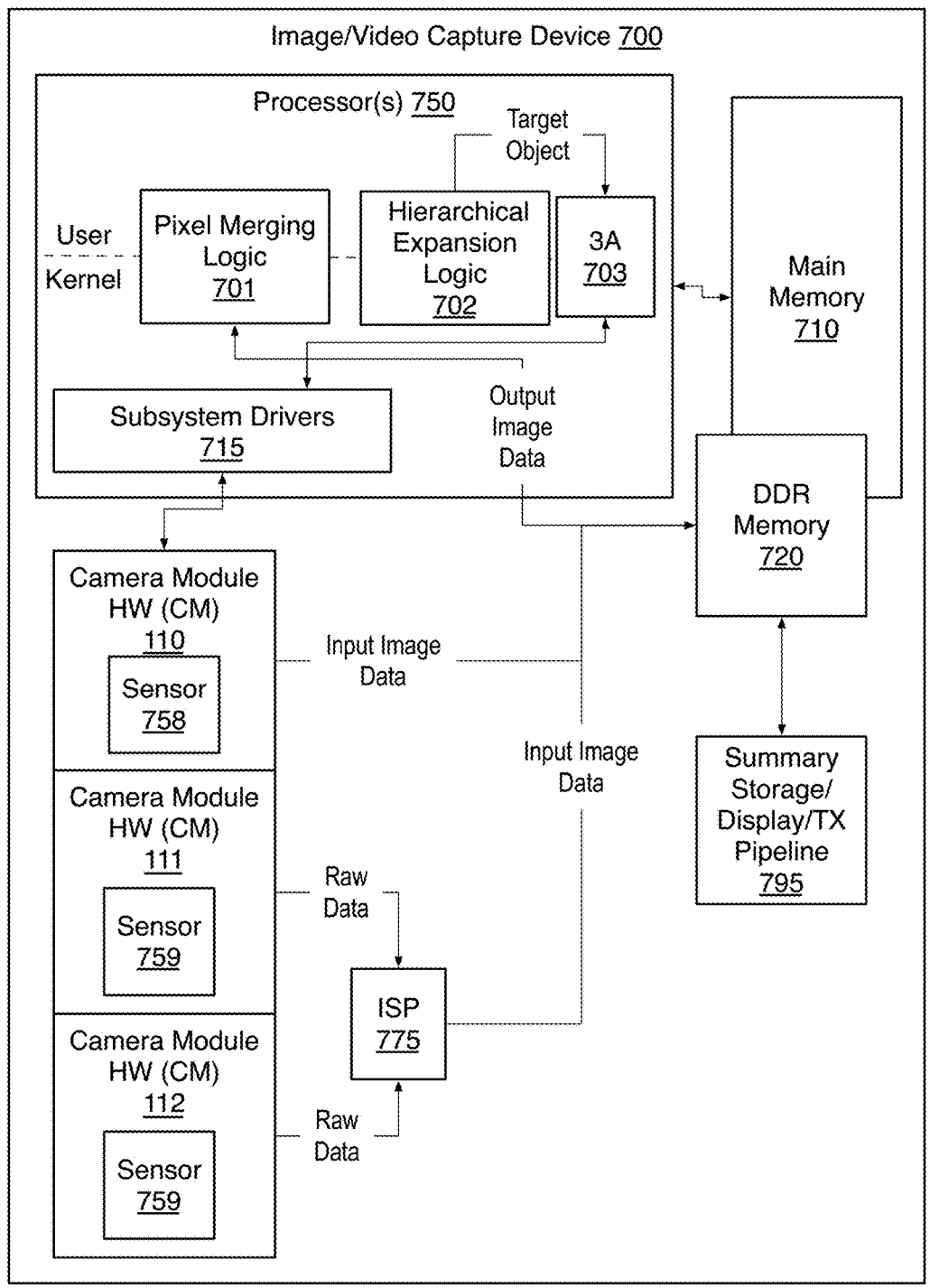
FIG. 7 is a functional block diagram of an image capture device including a processor with pixel merging logic and hierarchical expansion logic, in accordance with embodiments.

FIG. 7 is a functional block diagram of an image capture device 700 including multi-layered segmentation logic that further includes pixel merging logic and hierarchical expansion logic, in accordance with embodiments. FIG. 7 further illustrates how a multi-layered segmentation logic may be integrated with various other components of image capture device 700 to provide enhanced video camera output. Image capture device 700 for example may be a portion of a mobile computing device platform. A mobile computing device may refer to any device having a processing system and a mobile power source or supply, such as one or more batteries, for example. Examples of a mobile computing device may include a laptop computer, tablet, touch pad, portable computer, handheld computer, palmtop computer, personal digital assistant (PDA), cellular telephone, combination cellular telephone/PDA, television, smart device (e.g., smartphone, tablet or smart television), mobile internet device (MID), messaging device, data communication device, and so forth. Examples of a mobile computing device also include computers and/or media capture/transmission devices configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Image capture device 700 includes hardware CM 110, 111, and 112. In the exemplary embodiment, CM 110 further includes a RGB(NIR) camera sensor 758 while CM 111 and 112 each include a RGB(NIR) camera sensor 759. Sensor 758 may be a HD, FHD, QXGA, WQXGA, QSXGA, or UHD format digital image device, for example. In some embodiments, sensor 758 has at least 8-megapixel resolution. Sensors 759 may be a HD, FHD, QXGA, WQXGA, QSXGA, or UHD format digital image device, for example. In some embodiments, sensors 759 have a lower pixel resolution than sensor 758, for example 1-5 mega pixel. Image/video capture device 700 may therefore generate three image frames concurrently, for example to provide RGB image data and image depth data for an RGB input image.

Camera sensors 758, 759 may provide a color resolution of 8 bits, or more per pixel, and be operable to capture continuous video frames progressively. Sensor 758 may have a pixel frequency of 170 MHz, or more. Sensors 758, 759 may include an RGB Bayer color filter, an analog amplifier, an A/D converter, other components to convert incident light into a digital signal corresponding to raw image data. Sensors 758, 759 may be controlled to operate a rolling shutter or electronic focal plane shutter process where pixels are read out progressively in a line-sequential fashion for a frame. CM 110, 111, and 112 may each output raw data associated with consecutively exposed frames in conformance with any known streaming protocol, such as a MIPI.

In the exemplary embodiment, raw image/video data output by CM 111 and 112 is input to ISP 775. ISP 775 is to receive and analyze frames of raw video data during the horizontal and/or vertical blanking periods associated with CM 111 and 112. During raw image data processing of RGB image data, ISP 775 may perform one or more of color space conversion, noise reduction, pixel linearization, and shading compensation, for example. In some embodiments, raw image data is passed through ISP 775 to be processed downstream by a programmable microprocessor 750.

Image data output by ISP 775 may be buffered and queued as input image data ready for further image processing, such as scene segmentation label optimization and/or depth value label optimization, for example in accordance with one or more of the embodiments described elsewhere herein. In embodiments, processor(s) 750 includes logic to perform the initial labeling (pre-segmentation) operations and algorithms described elsewhere herein. In some embodiments, processor(s) 750 includes pixel merging logic 701 to perform one or more of the operations of pixel merging method 301. In some embodiments, pixel merging logic 701 is implemented with programmable circuitry including registers that have been configured through software instruction(s). In some embodiments, processor(s) 750 includes hierarchical expansion logic 702 to perform one or more of the fast MRF alpha-expansion methods 302, 402 described elsewhere herein. In some embodiments, hierarchical expansion logic 702 is implemented with programmable circuitry including registers that have been configured through software instruction(s). In some embodiments, processor(s) 750 are include multiple cores and at least one level of the hierarchical expansion logic 702 is distributed between the multiple cores.

In embodiments, processor(s) 750 includes logic to perform the multi-layer segmentation operations and algorithms described elsewhere herein. In some embodiments, processor(s) 750 includes logic to perform one or more of the operations of multi-layer segmentation method 201. In some embodiments, scene segmentation logic is implemented with programmable circuitry including registers that have been configured through software instruction(s). In some embodiments, pixel merging logic 701 and/or hierarchical expansion logic 702 includes logic to segment the image data based at least on a pixel depth, a pixel color, and a pixel spatial position within the image frame.

Both software and hardware implementations may be well suited to implementing multi-layered segmentation method 201 with a fast MRF optimization in accordance with embodiments described herein. For hardware implementations, pixel merging logic 701 and/or hierarchical expansion logic 702 may be implemented by fixed function logic, for example provided by ISP 775. For software implementations, any known programmable processor, including a core of processor(s) 750, an execution unit of a graphics processor, or other similar vector processor, may be utilized to implement the pixel merging logic 701 and/or hierarchical expansion logic 702. Processor(s) 750 may be solely responsible for generating object segmentation data from input image data received from ISP 775. In one exemplary embodiment, pixel merging logic 701 and/or hierarchical expansion logic 702 are invoked through the user space of a software stack instantiated by processor(s) 750. In some embodiments, processor(s) 750 executes a multi-layered segmentation algorithm including pixel merging logic and hierarchical expansion logic instantiated in a kernel space of the software stack. In some embodiments, processor(s) 750 is programmed with instructions stored on a computer readable media to cause the processor to perform one or more pixel merging and hierarchical expansions, for example as described elsewhere herein.

As further illustrated in FIG. 7, image segmentation data may be output to storage/display/transmission pipeline 795. In one exemplary storage pipeline embodiment, image segmentation data is written to electronic memory 720 (e.g., DDR, etc.) to supplement stored input image data. Memory 720 may be separate or a part of a main memory 710 accessible to processor 750. Alternatively, or in addition, storage/display/transmission pipeline 795 is to transmit image segmentation data and/or input image data off video/image capture device 700.

In one exemplary embodiment illustrated by FIG. 7, processor 750 further includes 3A module 703 that is to implement one or more camera control algorithm (CCA). Exemplary CCA algorithms include automatic white balancing (AWB), automatic focus (AF), and automatic exposure control (AEC), often referred to together as "3A" control. AEC and AF involve the control of CM 110, while AWB involves the control of ISP 775. Exemplary CM control parameters include aperture size, shutter speed, neutral density (ND) filter control, flash power, analog gain (AG), and digital gain (DG). Exemplary ISP control parameters include white balancing gains, lens shading correction (LSC) gains, and noise suppression. In some embodiments, 3A module 703 generates camera control parameters based on image segmentation data output from pixel merging logic 701 and/or hierarchical expansion logic 702. For example, 3A module 703 may execute at least one of an automatic focus (AF) algorithm, automatic exposure (AE) algorithm, or automatic white balance (AWB) algorithm based on an image segment identifier output from hierarchical expansion logic 702.

Figure 8:
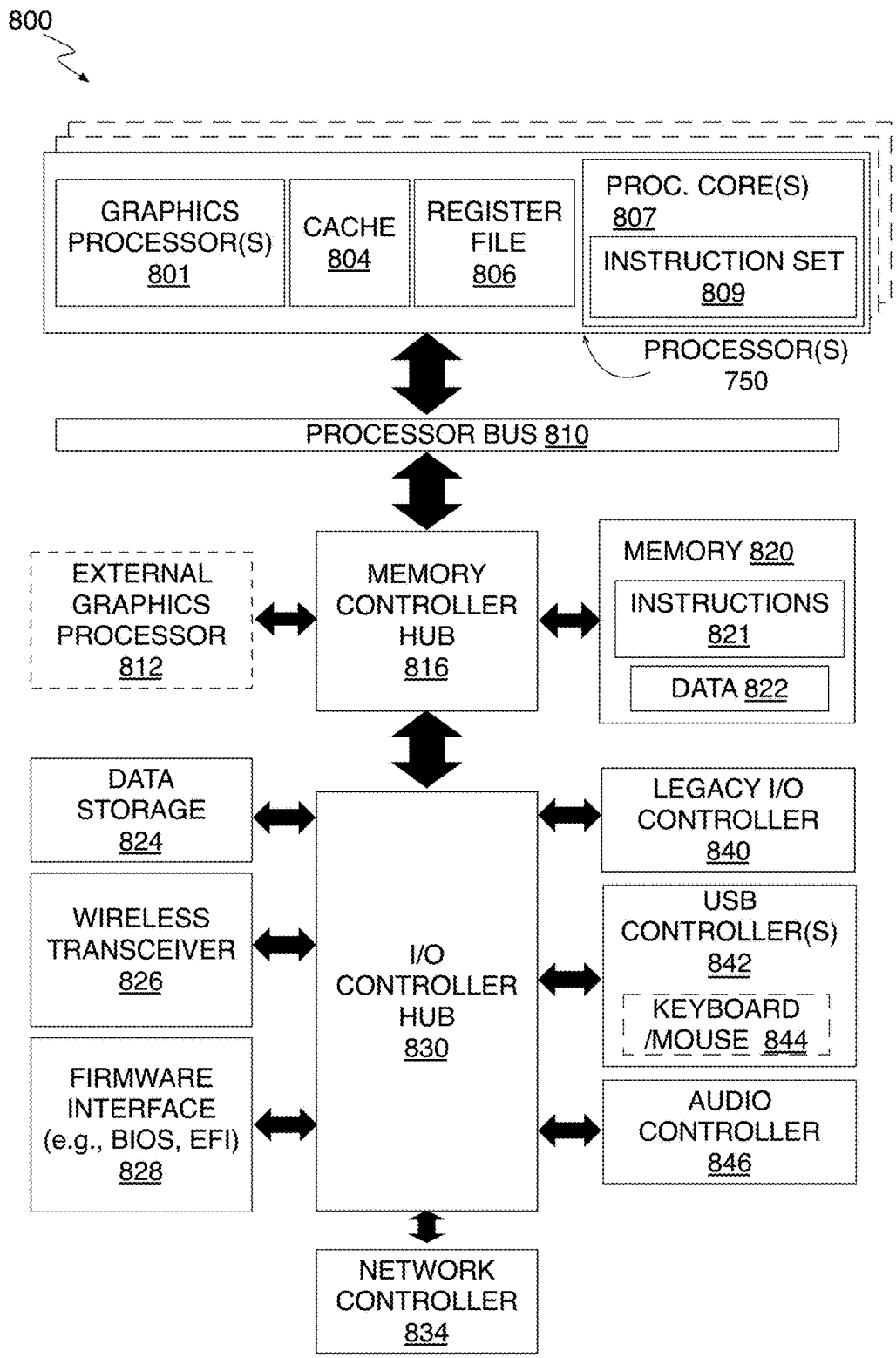
FIG. 8 is a block diagram of a data processing system, in accordance with some embodiments.

FIG. 8 is a block diagram of a data processing system 800 that may be utilized to perform multi-layer image segmentation according to some embodiments. Data processing system 800 includes one or more processors 750 and one or more graphics processors 801, and may be a single processor desktop system, a multiprocessor workstation system, or a server system having a large number of processors 750 or processor cores 807. In on embodiment, the data processing system 800 is a system-on-a-chip (SoC) integrated circuit for use in mobile, handheld, or embedded devices.

An embodiment of data processing system 800 can include, or be incorporated within a server-based gaming platform, a game console, including a game and media console, a mobile gaming console, a handheld game console, or an online game console. In some embodiments, data processing system 800 is a mobile phone, smart phone, tablet computing device or mobile Internet device. Data processing system 800 can also include, couple with, or be integrated within a wearable device, such as a smart watch wearable device, smart eyewear device, augmented reality device, or virtual reality device. In some embodiments, data processing system 800 is a television or set top box device having one or more processors 750 and a graphical interface generated by one or more graphics processors 801.

In some embodiments, the one or more processors 750 each include one or more processor cores 807 to process instructions which, when executed, perform operations for system and user software. In some embodiments, each of the one or more processor cores 807 is configured to process a specific instruction set 809. In some embodiments, instruction set 809 may facilitate Complex Instruction Set Computing (CISC), Reduced Instruction Set Computing (RISC), or computing via a Very Long Instruction Word (VLIW). Multiple processor cores 807 may each process a different instruction set 809, which may include instructions to facilitate the emulation of other instruction sets. Processor core 807 may also include other processing devices, such a Digital Signal Processor (DSP).

In some embodiments, the processor 750 includes cache memory 804. Depending on the architecture, the processor 750 can have a single internal cache or multiple levels of internal cache. In some embodiments, the cache memory is shared among various components of the processor 750. In some embodiments, the processor 750 also uses an external cache (e.g., a Level-3 (L3) cache or Last Level Cache (LLC)) (not shown), which may be shared among processor cores 807 using known cache coherency techniques. A register file 806 is additionally included in processor 750 which may include different types of registers for storing different types of data (e.g., integer registers, floating point registers, status registers, and an instruction pointer register). Some registers may be general-purpose registers, while other registers may be specific to the design of the processor 750.

In some embodiments, processor 750 is coupled to a processor bus 810 to transmit data signals between processor 750 and other components in system 800. System 800 has a 'hub' system architecture, including a memory controller hub 816 and an input output (I/O) controller hub 830. Memory controller hub 816 facilitates communication between a memory device and other components of system 800, while I/O Controller Hub (ICH) 830 provides connections to I/O devices via a local I/O bus.

Memory device 820 can be a dynamic random access memory (DRAM) device, a static random access memory (SRAM) device, flash memory device, or some other memory device having suitable performance to serve as process memory. Memory 820 can store data 822 and instructions 821 for use when processor 750 executes a process. Memory controller hub 816 also couples with an optional external graphics processor 812, which may communicate with the one or more graphics processors 801 in processors 750 to perform graphics and media operations.

In some embodiments, ICH 830 enables peripherals to connect to memory 820 and processor 750 via a high-speed I/O bus. The I/O peripherals include an audio controller 846, a firmware interface 828, a wireless transceiver 826 (e.g., Wi-Fi, Bluetooth), a data storage device 824 (e.g., hard disk drive, flash memory, etc.), and a legacy I/O controller 840 for coupling legacy devices to the system. One or more Universal Serial Bus (USB) controllers 842 connect input devices, such as keyboard and mouse 844 combinations. A network controller 834 may also couple to ICH 830. In some embodiments, a high-performance network controller (not shown) couples to processor bus 810.

Figure 9:
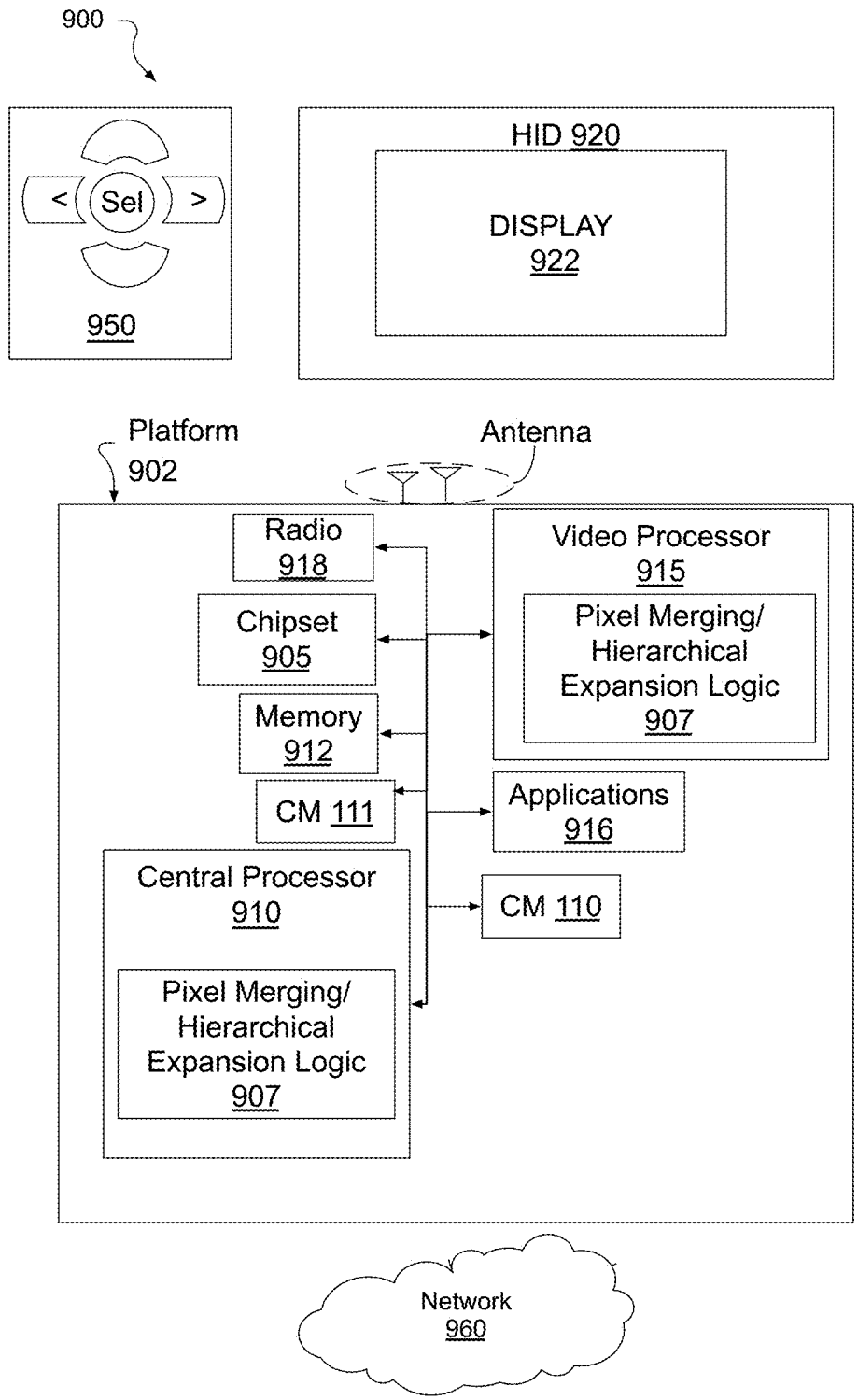
FIG. 9 is a diagram of an exemplary ultra-low power system including a processor with pixel merging logic and hierarchical expansion logic, in accordance with some embodiments.

FIG. 9 is a diagram of an exemplary ultra-low power system 900 employing a pixel merging logic and/or hierarchical expansion logic 907, in accordance with one or more embodiment. System 900 may be a mobile device although system 900 is not limited to this context. System 900 may be incorporated into a wearable computing device, laptop computer, tablet, touch pad, handheld computer, palmtop computer, cellular telephone, smart device (e.g., smart phone, smart tablet or mobile television), mobile internet device (MID), messaging device, data communication device, and so forth. System 900 may also be an infrastructure device. For example, system 900 may be incorporated into a large format television, set-top box, desktop computer, or other home or commercial network device.

System 900 includes a device platform 902 that may implement all or a subset of the various image segmentation methods described above in the context of FIG. 1-FIG. 5. In various exemplary embodiments, video processor 915 executes image segmentation methods, for example as described elsewhere herein. Video processor 915 includes logic circuitry 907 implementing pixel merging logic and/or hierarchical expansion logic to rapidly optimized labeling of image pixels based on both color and depth, for example as described elsewhere herein in the context of pixel merging logic 701 and/or hierarchical expansion logic 702. In some embodiments, one or more computer readable media may store instructions, which when executed by CPU 910 and/or video processor 915, cause the processor(s) to execute one or more of the pre-segmentation and segmentation operations described elsewhere herein. One or more image data frames exposed by CM 110 and/or CM 111 may then be stored in memory 912 in associated with segmentation data.

In embodiments, device platform 902 is coupled to a human interface device (HID) 920. Platform 902 may collect raw image data with CM 110 and 111, which is processed and output to HID 920. A navigation controller 950 including one or more navigation features may be used to interact with, for example, device platform 902 and/or HID 920. In embodiments, HID 920 may include any monitor or display 922 coupled to platform 902 via radio 918 and/or network 960. HID 920 may include, for example, a computer display screen, touch screen display, video monitor, television-like device, and/or a television.

In embodiments, device platform 902 may include any combination of CM 110, chipset 905, processors 910, 915, memory/storage 912, applications 916, and/or radio 918. Chipset 905 may provide intercommunication among processors 910, 915, memory 912, video processor 915, applications 916, or radio 918.

One or more of processors 910, 915 may be implemented as one or more Complex Instruction Set Computer (CISC) or Reduced Instruction Set Computer (RISC) processors; x86 instruction set compatible processors, multi-core, or any other microprocessor or central processing unit (CPU).

Memory 912 may be implemented as a volatile memory device such as, but not limited to, a Random Access Memory (RAM), Dynamic Random Access Memory (DRAM), or Static RAM (SRAM). Memory 912 may also be implemented as a non-volatile storage device such as, but not limited to flash memory, battery backed-up SDRAM (synchronous DRAM), magnetic memory, phase change memory, and the like.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

The thresholded pixel value matching and associated object processes comporting with exemplary embodiments described herein may be implemented in various hardware architectures, cell designs, or "IP cores."

Figure 10:
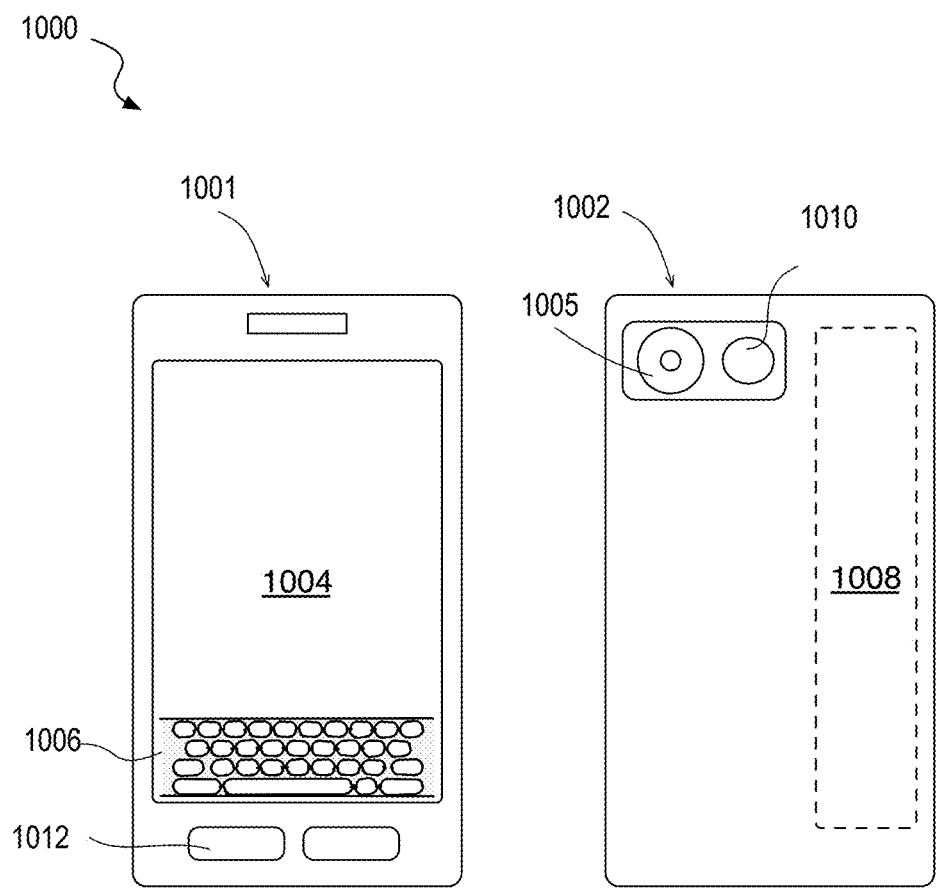
FIG. 10 is a diagram of an exemplary mobile handset platform, arranged in accordance with some embodiments.

As described above, system 900 may be embodied in varying physical styles or form factors. FIG. 10 further illustrates embodiments of a mobile handset device 1000 in which platform 902 and/or device 700 may be embodied. In embodiments, for example, device 700 may be implemented as a mobile computing handset device having wireless capabilities. As shown in FIG. 10, mobile handset device 1000 may include a housing with a front 1001 and back 1002. Device 1000 includes a display 1004, an input/output (I/O) device 1006, and an integrated antenna 1008. Device 1000 also may include navigation features 1012. Display 1004 may include any suitable display unit for displaying information appropriate for a mobile computing device. I/O device 1006 may include any suitable I/O device for entering information into a mobile computing device. Examples for I/O device 1006 may include an alphanumeric keyboard, a numeric keypad, a touch pad, input keys, buttons, switches, microphones, speakers, voice recognition device and software, and so forth. Information also may be entered into device 1000 by way of microphone (not shown), or may be digitized by a voice recognition device. Embodiments are not limited in this context. Integrated into at least the back 1002 is cameras 1005 and 1010 (e.g., each including a lens, an aperture, and an imaging sensor), both of which may be components of one or more CM through which image data is exposed and output to a multi-layer image segmentation system including pixel merging logic and/or hierarchical expansion logic, for example as described elsewhere herein.

As exemplified above, embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood as physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following paragraphs briefly describe some exemplary embodiments:

In one or more first embodiments, a computer-implemented scene labeling method comprises receiving image data including one or more data value for each of a plurality of pixels in an image frame, merging, into pixel groups, pixels based on a similarity of a data cost associated with being assigned a particular label, assigning predetermined labels to the pixel groups based on an optimization of a labeling function over all of the pixel groups, and storing label assignment information to an electronic memory in association with the image data.

In furtherance of the first embodiments, the merging is further based on a neighborhood cost associated with two neighboring pixels having same or different labels.

In furtherance of the embodiment immediately above, the merging comprises merging a first pixel with a second pixel in response to determining the label minimizes a first data cost associated with assigning a label to the first pixel, and minimizes a second data cost associated with assigning a label to the second pixel, and in response to determining the neighborhood cost associated with assigning different labels to the first and second pixel satisfy a discontinuity threshold.

In furtherance of the embodiment immediately above, the discontinuity threshold is dependent upon a distribution of neighborhood costs over the plurality of pixels.

In furtherance of the embodiment immediately above, the discontinuity threshold exceeds at least 50% of the population of neighborhood costs associated with the plurality of pixels.

In furtherance of some of the first embodiments, the merging comprises merging the first pixel with the second pixel is in further response to the number of pixels the pixel group satisfying a predetermined maximum pixel count.

In furtherance of the first embodiments, the labeling function comprises the data cost, and a neighborhood cost associated with two neighboring pixels having same or different labels. Assigning labels to the pixel groups based on an optimization of the labeling function over all of the pixel groups further comprises performing a global alpha-expansion over the pixel groups.

In furtherance of the embodiment immediately above, the data cost and the neighborhood cost are functions of at least a pixel depth, pixel color, and pixel spatial position within the image frame.

In furtherance of the first embodiments, the method further comprises grouping subsets of the predetermined labels into label groups. Assigning the predetermined labels to the pixel groups based on the optimization of the labeling function over all of the pixel groups further comprises assigning one of the label groups to each of the pixel groups based on an optimization of the labeling function over all of the pixel groups, and assigning the predetermined labels in the label group to pixels in the pixel groups based on an optimization of the labeling function over all of the pixels in each pixel group.

In furtherance of the embodiment immediately above, assigning one of the predetermined labels in the label group to the pixels in the pixel groups the further comprises assigning labels to pixels in a first pixel group with a first processor thread or a first processor core, and assigning labels to pixels in a second pixel group with a second processor thread or a second processor core.

In furtherance of the first embodiments, grouping one or more of the predetermined labels to a label group further comprises generating a label group for each predetermined label, and combining a first label with a second label into a label group in response to the first label connecting to the second label and a neighborhood cost associated with two neighboring pixels having different labels satisfying a threshold.

In furtherance of the embodiment immediately above, the method further comprises determining if there is a sufficiently large neighborhood cost by summing the a neighborhood cost associated with two neighboring pixels having the first and second labels over all neighboring pixels with those labels, computing a quotient of the neighborhood cost sum and a sum of the image frame areas occupied by the first and second labels, and comparing the quotient to a threshold.

In furtherance of the embodiment immediately above, the quotient threshold is based upon a distribution of neighborhood costs between all the predetermined labels.

In furtherance of the first embodiment, the predetermined label comprises a scene segment identifier, or a scene depth or disparity value.

One or more second embodiments, one or more computer-readable storage media includes instructions stored thereon, which when executed by a processor, cause the processor to perform a method comprising receiving image data including one or more data value for each of a plurality of pixels in an image frame, merging, into pixel groups, pixels based on a similarity of a data cost associated with being assigned a particular label, assigning predetermined labels to the pixel groups based on an optimization of a labeling function over all of the pixel groups, and storing label assignment information to an electronic memory in association with the image data.

In furtherance of the embodiment immediately above, the media further comprises instructions to cause the processor to further perform the method comprising grouping subsets of the predetermined labels into label groups. Assigning the predetermined labels to the pixel groups based on an optimization of the labeling function over all of the pixel groups further comprises assigning one of the label groups to each of the pixel groups based on optimization of the labeling function over all of the pixel groups, and assigning the predetermined labels in the label groups to pixels in the pixel groups based on an optimization of the labeling function over all of the pixels in each pixel group.

In one or more third embodiments, an image capture device comprises one or more camera hardware modules including an image sensor to output image data including one or more data value for each of a plurality of pixels in an image frame. The device comprises a processor communicatively coupled to the one or more camera hardware modules, the processor including programmable logic circuitry configured to merge pixels of the image frame into pixel groups based on a similarity of a data cost associated with the pixels being assigned a particular label, and to assign predetermined labels to pixel groups in the image frame by executing a graph cut algorithm to optimize a labeling function over all of the pixel groups. The device further comprises an electronic memory to store pixel-label assignment information in association with the image frame.

In further of the third embodiments, the one or more camera hardware modules include two or more image sensors. The image data includes depth or disparity data. The labeling function comprises the data cost, and a neighborhood cost associated with two neighboring pixels having same or different labels. The data cost and the neighborhood cost are functions of at least a pixel depth, pixel color, and pixel spatial position within the image frame, and the processor includes logic circuitry to perform a global alpha-expansion over the pixel groups.

In furtherance of the third embodiments, the processor includes logic circuitry further configured to group subsets of the predetermined labels into label groups, to assign the labels to pixel groups in the image frame by assigning one of the label groups to each of the pixel groups based on optimization of the labeling function over all of the pixel groups, and to assign the predetermined labels in the label groups to pixels in the pixel groups based on an optimization of the labeling function over all of the pixels in each pixel group In furtherance of the embodiment immediately above, the processor further includes a first logic core comprising logic circuitry to assign labels to pixels in a first pixel group by executing a graph cut algorithm with a first processor thread, and a second logic core comprising logic circuitry to assign labels to pixels in a second pixel group by executing a graph cut algorithm with second processor thread.

In one or more fourth embodiments, an image capture device comprises a means to perform any one of the first embodiments.

In furtherance of the fourth embodiments, the means further comprises one or more camera hardware modules including an image sensor to output the image data, and a processor communicatively coupled to the one or more camera hardware modules, the processor including programmable logic circuitry configured to merge pixels into the pixel groups, and to assign the labels to the pixel groups by executing the graph cut algorithm to optimize the labeling function over all of the pixel groups.

In one or more fifth embodiments, a computer-readable media includes instructions stored thereon, which when executed by a processor, causes the processor to perform any one of the first embodiments.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. A computer-implemented scene labeling method, comprising:
    receiving image data including one or more data value for each of a plurality of pixels in an image frame;
    merging pixels into pixel groups, the merging based on a data cost associated with individual ones of the pixels being assigned a particular label, and a neighborhood cost associated with two neighboring pixels having same or different labels;
    grouping labels into label groups;
    assigning one of the label groups to each of the pixel groups based on optimization of a labeling function over all of the pixel groups, the labeling function comprising the data cost, and the neighborhood cost; and
    assigning labels within a label group to pixels of corresponding ones of the pixel groups, wherein the assigning is based on an optimization of the labeling function over all the pixels within each pixel group; and
    storing label assignment information to an electronic memory in association with the image data.

2. The method of claim 1, wherein the merging comprises merging a first pixel with a second pixel in response to:
    determining the label minimizes a first data cost associated with assigning a label to the first pixel, and minimizes a second data cost associated with assigning a label to the second pixel; and
    determining the neighborhood cost associated with assigning different labels to the first and second pixel satisfy a discontinuity threshold.

3. The method of claim 2, wherein the discontinuity threshold is dependent upon a distribution of neighborhood costs over the plurality of pixels.

4. The method of claim 3, wherein the discontinuity threshold exceeds at least 50% of the population of neighborhood costs associated with the plurality of pixels.

5. The method of claim 2, wherein the merging comprises merging the first pixel with the second pixel in further response to the number of pixels the pixel group satisfying a predetermined maximum pixel count.

6. The method of claim 1, wherein:
    assigning one of the label groups to each of the pixel groups based on an optimization of the labeling function over all of the pixel groups further comprises performing a global alpha-expansion over the pixel groups.

7. The method of claim 6, wherein the data cost and the neighborhood cost are functions of at least a pixel depth, pixel color, and pixel spatial position within the image frame.

8. The method of claim 1, wherein assigning one of the labels in the label group to the pixels in the corresponding pixel groups further comprises assigning labels to pixels in a first pixel group with a first processor thread or a first processor core, and assigning labels to pixels in a second pixel group with a second processor thread or a second processor core.

9. The method of claim 1, wherein grouping the labels to a label group further comprises:
    generating a label group for each label; and
    combining a first label with a second label into the label group in response to the first label connecting to the second label, and a neighborhood cost associated with two neighboring pixels having different labels satisfying a threshold.

10. The method of claim 9, further comprising determining if there is a sufficiently large neighborhood cost by:
    summing the a neighborhood cost associated with two neighboring pixels having the first and second labels over all neighboring pixels with those labels;
    computing a quotient of the neighborhood cost sum and a sum of the image frame areas occupied by the first and second labels; and
    comparing the quotient to a threshold.

11. The method of claim 10, wherein the quotient threshold is based upon a distribution of neighborhood costs between all the labels.

12. The method of claim 1, wherein individual ones of the labels comprise a scene segment identifier predetermined based at least in part on a scene depth or disparity value.

13. One or more non-transitory computer-readable storage media, with instructions stored thereon, which when executed by a processor, cause the processor to perform a method comprising:
    receiving image data including one or more data value for each of a plurality of pixels in an image frame;
    merging pixels into pixel groups, the merging based on a data cost associated with individual ones of the pixels being assigned a particular label, and a neighborhood cost associated with two neighboring pixels having same or different labels;
    grouping labels into label groups;
    assigning one of the label groups to each of the pixel groups based on optimization of a labeling function over all of the pixel groups, the labeling function comprising the data cost, and the neighborhood cost;
    assigning labels within a label group to pixels of corresponding ones of the pixel groups, wherein the assigning is based on an optimization of the labeling function over all the pixels within each pixel group; and
    storing label assignment information to an electronic memory in association with the image data.

14. An image capture device, comprising:
    one or more camera hardware modules including an image sensor to output image data including one or more data value for each of a plurality of pixels in an image frame;
    a processor communicatively coupled to the one or more camera hardware modules, the processor including programmable logic circuitry configured to:
        merge pixels of the image frame into pixel groups, the merge based on a data cost associated with individual ones of the pixels being assigned a particular label, and a neighborhood cost associated with two neighboring pixels having same or different labels;
        group labels into label groups;
        assign one of the label groups to each of the pixel groups based on optimization of a labeling function over all of the pixel groups, the labeling function comprising the data cost, and the neighborhood cost; and
        assign labels within a label group to pixels of corresponding ones of the pixel groups, wherein the assigning is based on an optimization of the labeling function over all the pixels within each pixel group; and
    an electronic memory to store pixel-label assignment information in association with the image frame.

15. The device of claim 14, wherein:
the one or more camera hardware modules include two or more image sensors;
the image data includes depth or disparity data;
the data cost and the neighborhood cost are functions of at least a pixel depth, pixel color, and pixel spatial position within the image frame; and
the processor includes logic circuitry to perform a global alpha-expansion over the pixel groups.

16. The device of claim 15, wherein the processor further includes:
a first logic core comprising logic circuitry to assign labels in a first label group to pixels in a first pixel group by executing a graph cut algorithm with a first processor thread; and
a second logic core comprising logic circuitry to assign labels in a second label group to pixels in a second pixel group by executing a graph cut algorithm with second processor thread.

* * * * *